May 22, 1928.  
A. E. SPINASSE  
1,670,909  
APPARATUS FOR DRAWING GLASS ARTICLES  
Original Filed Dec. 7, 1916
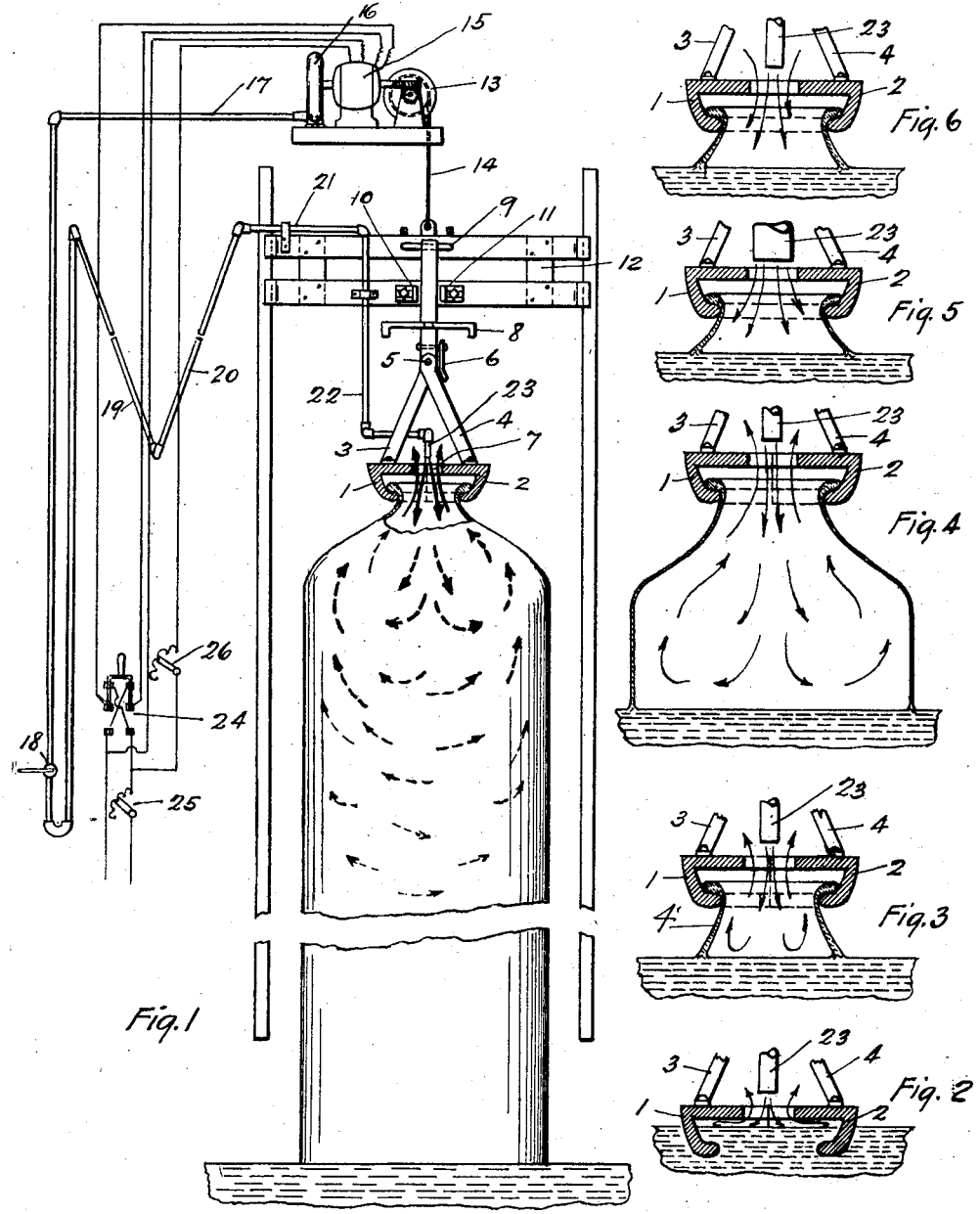
Inventor  
Arthur E. Spinasse  
By Edwin P. Corker  
Attorney Patented May 22, 1928.

1,670,909

UNITED STATES PATENT OFFICE.

ARTHUR E. SPINASSE, OF MOUNT VERNON, OHIO.

APPARATUS FOR DRAWING GLASS ARTICLES.

Application filed December 7, 1916, Serial No. 135,680. Renewed March 5, 1926.

My invention relates to method of and apparatus for drawing glass and has to do primarily with the formation of hollow glass articles of cylindrical or other shapes for the manufacture of window glass, although not limited to the forming of hollow glass articles.

Hithertofore in drawing and particularly in drawing hollow glass articles, the initial portion of the hollow glass article has, of necessity, been drawn at a much lower elevating speed than the remainder of the cylinder. This has been necessary because of the fluid nature of the initial portion of the glass and the tendency of this initial portion to "blow thin" and form glass of less thickness than the remainder of the cylinder. The result has been either an initial portion when the initial draw was too rapid which was too thin or a final portion drawn from glass too cold. The time wasted in the slow initial elevation had to be made up in the final elevation with the result that the final drawing action, with the glass already injuriously affected by the falling temperature of the bath became too rapid and tended to stretch unduly rather than draw the glass cylinder, producing lines and other known defects as well as an unstable molecular condition of the cylinder walls.

My invention is aimed at effecting uniformity in the speed of the draw and couples this with an even thickness of glass walls of good temper and quality. I accomplish this by a novel method of cooling the initial portion of the article while it is being formed, so that the initial speed of the drawing operation need not be lower than the final speed. This is insured by the fact that, in my method, the cooling medium is only temporarily in juxtaposition to the glass bath, being withdrawn therefrom with the initial portion of the cylinder. It will be obvious that, since I have reduced the time necessary for forming the initial portion of the article, I have increased the speed of the whole drawing operation.

In preferred form my invention contemplates a bait with its roof partially open and with a blow pipe mounted to inject air into such opening but preferably regulably spaced therefrom and so connected thereto that, with air under proper pressure and in proper volume being ejected from said pipe, it is possible to attain a suitable cylinder forming and cooling jet within the bait and cylinder being drawn.

In its most developed form, my invention also contemplates the use of non-adherent bait and desirably a hollow bait of a resiliently expansible nature. It also embraces the chilling of the initial portion of the cylinder by the peculiar use of the air in conjunction with the non-adherent bait.

Desirably, my invention contemplates the use of a relatively small hollow bait with a reduced air inlet and an air outlet therein. It is likewise desirable that the inlet pipe be spaced from the walls of the inlet opening in the roof of the bait. From this there results an initial contact of cooling air with the glass being gathered by the bait and the glass within the bait and, then, an air cushion, which grows larger as the space within the cylinder increases. The air introducing pipe may be smaller or larger than this opening, but it is important as a part of my present invention that there be a space or opening in the roof of the bait head through which the air may escape from the bait while it is being introduced. I make the opening in the roof of the bait where it serves as an inlet and exit also for the flow of air.

Preferably my invention contemplates a resiliently expansible bait and, although a solid bait may be used, such an expansible bait is peculiarly desirable in view of the fact that a chilling draft of air may be introduced at the initiation of the draw with such force and quantity as to bring the initial portion of the hollow article into contact with the walls of the bait. It will probably be well to describe the apparatus preferably utilized in performing my method, before I more fully bring out the essential features of this method.

Attention is directed to the fact that I form a neck and shoulder at the initiation of my drawing operation. With my invention, the very formation of this neck and shoulder results in a saving of time, where it has hitherto caused a loss of time. The cap may, however, be blown out at once, thus avoiding the formation of a neck.

My preferred apparatus is illustrated in the accompanying drawings, wherein similar characters of reference designate corresponding parts, and wherein Figure 1 is a side elevation partly in section, of my apparatus in the operation of drawing a cylinder.

Figure 2 is a detail in section of a bait used in accordance with my improved method, this feature illustrating the size and position of the air supply pipe in relation to the opening in the roof of the bait.

Figure 3 is a detail in section showing the neck of the cylinder partially drawn.

Figure 4 is a similar detail showing the neck and shoulders of the cylinder practically completed.

Figure 5 shows a slight modification in the size of the pipe and illustrating the introduction of air to a solid bait and the cylinder neck in a manner precluding escape of air from such bait and cylinder.

Figure 6 is a view similar to Figure 5 indicating the manner in which atmospheric air may be drawn into the bait and cylinder neck by the air from the supply pipe.

In the drawings, it will be noted that the bait is formed in sections 1 and 2. These sections are rigidly attached to and supported by members 3 and 4 which are pivoted together as at 5 and which are resiliently held from spreading by the spring latch 6, it being possible to swing this spring latch out of operative position and completely separate the bait sections. The roof of each bait section is cut out so that the bait as a whole is provided with an opening 7 in its roof for a purpose to be more fully described hereinafter. The member 3 is extended beyond the pivot 5 and has a cross piece 8 intermediate its length to facilitate detachment of the bait structure from the carriage which raises or lowers it. The upper end of the member 3 carries a hook which hooks over a horizontal rod 9. The bait structure may be adjusted along this horizontal rod 9 under the control of slotted L-shaped braces 10 and 11.

The horizontal rod 9 is mounted upon a raising and lowering carriage 12 and the raising and lowering of this carriage is effected by a pulley structure or winding drum 13 through the medium of a cable 14 secured to such carriage. The drum 13 is driven, preferably through a worm and worm wheel connection by a motor or other prime mover 15. It is important to note that this motor 15 also drives an independent blower 16. Thus, I am able to generate air pressure at the machine to which it is supplied. More important, still, is the fact that I am enabled to and actually use a three unit set embracing a motor, an independent air generator, and a mechanism for lowering and raising the bait carriage, the generator and mechanism being operated by the single motor. The importance of this is that the variation of the speed of draw results in variation of the generation of air and the control of the motor results in the control of both the air-supply and the speed of the draw at the same time, save when their relative actions are varied by means provided. This means comprises an independent control for the air supply. The blower forces air through pipe 17 past the valve 18 for controlling the quantity supplied, through the automatically adjustable pipes 19 and 20, through pipe 21 and adjustable elbow pipes 22 to the delivery nozzles 23. The pipes 19 and 20 are so movable as to permit upward and downward movement of the carriage 12 and the remaining pipe structure is so adjustable as to permit a proper centering of the nozzle 23 in spaced relation to the opening 7 in the roof of the bait. In conjunction with the shunt motor 15 a reversing switch 24 is provided and a rheostat 25 serves to control the current from a suitable source of power, while a rheostat 26 serves to control the current in the field circuit and thereby the speed of the motor 15. The means broadly for controlling the speed of the motor is claimed in my co-pending application, Serial Number 50,823, filed September 15, 1915.

It will be obvious from the description of the apparatus that the bait used is resiliently expansible and that the mounting of it is such as to automatically center its sections and the opening in its roof with relation to the air supply nozzle 23. In the preferred application of my method, the bait with the air supply nozzle in the relation shown is lowered into the molten glass bath with the air shut off. Its position at this time is indicated in Figure 2 and it will be evident that there being no air pressure at this position the glass has flowed onto the bait ledge and as the bait begins to rise air is turned on being introduced through the air supply nozzle 23 and is being permitted to escape around such nozzle. Obviously, there is a chilling effect upon the surfaces of the glass by this air. This operation continues as the draw progresses and the conditions at and during the formation of the shoulder 4' are indicated by the arrows in Figure 3. The air being introduced is in the nature of a draft which not only chills the glass but preferably drives the glass into contact with the walls of the resiliently expansible bait. Thus, owing to the resiliently expansible characteristic bait and the chilling effect of the draft of air, the normal retarding effect of the too fluid glass at the initiation of the draw, is largely nullified and the drawing operation may proceed without delay since the initial walls of the cylinder can be blown outward without fear of producing too-thin walls and subsequent crushing by the bait, whose sections will shrink freely upon themselves upon contraction of the bait whereby dangerous constrictive pressure upon the glass is avoided. The next step in the operation is indicated in Figure 4 and it will be noted that a draft is still passing into the upper portion of the cylinder, into contact with the surface of the molten glass bath and out of the cylinder at the point of entrance. However, the continued progression of the drawing operation serves to withdraw this cooling draft from immediate access to the surface of the molten glass bath. The result after the draw has progressed is illustrated in Figure 1 and the variation in the size of the arrows indicating the cooling air within the cylinder denotes substantially the conditions which exist. Consideration will make it apparent that approximately ideal conditions result. The molten glass bath is usually too hot at the beginning of the drawing operation with the result that this drawing operation must be slowed. With my method, the bath is artificially cooled by a draft of air at the initiation of the drawing operation; then, as the drawing progresses and the cooling of the molten glass bath continues, the artificial cooling draft of air is automatically decreased and finally becomes substantially ineffective. Thus, it is possible to increase the aggregate speed of the drawing operation and obtain a more uniform drawing throughout. This necessarily results in the shortening of the time necessary for initiation of the drawing and for the entire draw.

It will further become apparent that the air is introduced into a hollow bait whose roof is only partly closed but sufficiently closed to insure some pressure within the cylinder. The result is a cushioning of the stream of air being introduced and a practical elimination of the undesirable pulsations which distort the walls of the cylinders in the present day operations.

Figure 5 shows one manner in which the air can be forced into the bait opening at such a pressure in relation to the speed of draw that no air will be permitted to escape, although a cushioning action will result.

Figure 6 shows a further modification wherein the bait is solid and whereby the air may be introduced with such force that atmospheric air will be drawn in with the air from the supply pipe.

It will be understood that my invention is not limited to a sectional bait, nor, in fact, to a cold bait.

It will be of considerable advantage when used with a solid or one-piece bait.

It will be noted that there are several factors to be considered in carrying out my process effectively. The process itself, i. e. the act of creating a drawn glass object whose walls are of uniform thickness and of glass not unduly strained or pulled, i. e. glass of good quality, depends (1) upon never letting the glass become too much cooled or too stiff, and (2) in keeping the glass at the genesis of the object always cooled just enough for the period of a draw. Now in ordinary drawing from a bath, as pointed out above, the glass gets too much cooled before the completion of a draw. At the beginning of the former process, as pointed out above, rapidity of draw is impossible. In my process I render the glass of the bath at the beginning sufficiently viscous to permit rapidity of draw, by withdrawing a certain amount of heat from the glass at the locus of genesis, and I continue to withdraw heat in smaller and smaller quantities as more and more is lost by radiation, but I draw so quickly that I never let enough heat escape from the glass to make the pull at the end of the draw too great to reduce the quality of glass produced.

The factors to be considered are, the temperature of the glass bath at the beginning of a draw, how much heat to withdraw, and where and how fast the glass loses heat from the bath to the atmosphere, and how fast to draw. The object is the production of uniform good glass, and the factors mentioned must all be coordinated to produce this result. The object I have shown here is a sheet in continuous form, i. e. a cylinder. Obviously the object might be something else or a sheet in some other form.

It is not to be understood that the conditions set forth above are to be completely met in an ideally perfect process. Allowances must be made. My apparatus is designed to produce the effect here indicated, and I have a direct driven fan on the shaft of my motor to create a sharp jet when needed, and rheostatic control. Thus I am able to get (1) proper and fine air under pressure in the cylinder drawn to obtain a cylinder with straight walls; (2) while at the same time a cooling effect at the initial stage of the drawing is obtained—which effect gradually recedes from the upper walls of the cylinder and from the bath of glass, so that the novel neck and cap may be drawn faster and the cylinder as a whole may be drawn faster, and what is not less important, with more equal speed, because this unique form of arrangement is adapted not to overdo but to properly compensate for unequal change in temperature conditions, thus a cylinder is drawn with greater rapidity with straight walls, and even thickness of walls, while the quality of the glass is maintained in the cylinder drawn, as well as in the bath of molten glass itself.

Having thus described my invention, what I claim is:

1. A glass drawing bait for forming hollow glass objects comprising a roof portion and a depending glass supporting flange, said roof portion having an opening therethrough relatively small compared with the diameter of the bait, and means for directing a jet of air through said opening, said air jet means being of such size relative to the opening and so disposed relative thereto as to provide a passage between the interior of the bait and the atmosphere.

2. A glass drawing bait for forming hollow glass objects comprising a roof portion and a depending flange having an inwardly extending supporting ledge, for supporting a glass cylinder without adhering thereto, said roof portion having an opening therethrough relatively small compared with the diameter of the bait, and means separated from the bait for directing a jet of air through said opening, said air jet means being of such size relative to the opening and so disposed relative thereto as to provide a passage between the interior of the bait and the atmosphere.

3. A glass drawing bait for forming hollow glass objects comprising a roof portion and a depending glass supporting flange, said roof portion having an opening therethrough relatively small compared with the diameter of the bait, and means for directing a jet of air through said opening, said air jet means being of such size relative to the opening and so disposed relative thereto as to provide a passage between the interior of the bait and the atmosphere, the interior of said bait being closed to the atmosphere when drawing except through the opening in the roof through which air is admitted.

4. A glass drawing bait for forming hollow glass objects comprising a roof portion and a depending flange having an inwardly extending supporting ledge for supporting a glass cylinder without adhering thereto, said roof portion having an opening therethrough relatively small compared with the diameter of the bait, and means separated from the bait for directing a jet of air through said opening, said air jet means being of such size relative to the opening and so disposed relative thereto as to provide a passage between the interior of the bait and the atmosphere, the interior of said bait being closed to the atmosphere except through the opening in the roof through which air is admitted.

5. A glass drawing bait for forming hollow glass objects comprising a roof portion and a depending glass supporting flange, said roof portion having an opening centrally therethrough relatively small compared with the diameter of the bait, means for supporting said bait, and means for supporting an air pipe centrally in line with said opening but separated from the roof of the bait whereby a small jet of air may be directed from said air pipe centrally through said opening to the interior of the bait.

6. A glass drawing bait for forming hollow glass objects comprising a roof portion and a depending glass supporting flange, said roof portion having an opening centrally therethrough relatively small compared with the diameter of the bait, means for supporting said bait, and means for supporting an air pipe centrally in line with said opening but separated from the roof of the bait whereby a small jet of air may be directed from said air pipe centrally through said opening to the interior of the bait, the interior of said bait being closed to the atmosphere when drawing except through said opening in the roof of the bait through which the air enters.

7. A glass drawing bait for forming hollow glass objects comprising a roof portion and a depending glass supporting flange, said flange having an inwardly curved ledge for supporting the glass cylinder being drawn, said roof portion having an opening centrally therethrough relatively small compared with the diameter of the bait, means for supporting said bait, and means for supporting an air pipe centrally in line with said opening but separated from the roof of the bait whereby a small jet of air may be directed from said air pipe centrally through said opening to the interior of the bait, said bait being adapted for drawing a glass cylinder of larger diameter than the bait wherein the neck portion of the cylinder may be supported by said ledge without adhering thereto.

8. A glass drawing bait for forming hollow glass objects comprising a roof portion having a depending flange at the outer edge thereof, which flange is incurved at its lower edge to support the neck portion of a commercial glass cylinder drawn by said bait, which cylinder is of considerably larger diameter than the bait, said roof portion having a central opening therethrough and closed to the atmosphere except for said opening, and means spaced from said roof portion and in injector relation to the opening through the bait for directing a jet of air through said opening.

9. In apparatus for drawing glass cylinders from a bath of molten glass, a bait for drawing the cylinders having a vent opening from the interior space of the glass cylinder being drawn by said bait to the free atmosphere, said vent opening being relatively small compared with the diameter of the bait, and an air jet pressure means located to direct a jet of air pressure into and through said vent opening to supply air pressure within the drawn glass cylinder.

10. In apparatus for drawing hollow glass articles and cylinders from a bath of molten glass, a bait having a diameter relatively small compared with the diameter of the cylinder to be drawn, said bait having a bottom opening and an interior surface to support a glass novel non-adherent thereto at the point of contact to the bait, said bait being constructed to maintain constant pressing relation upon the novel supported upon its interior during the drawing of said cylinder, and means for supplying a stream of air under pressure through said bait and into the cylinder drawn by said bait to expand and form the drawn cylinder as desired.

11. In apparatus for drawing hollow glass articles, a bait having a bottom opening and an interior surface to support a novel non-adherent at the point of contact to the bait, said bait being constructed to maintain constant relation with the glass novel supported upon its interior during drawing and having a passage open to the free atmosphere and in communication with the hollow article drawn by said bait, and means for directing a jet of air under pressure into and through said passage which is open to the free atmosphere for supplying air under pressure within the hollow glass article being drawn by said bait.

12. In apparatus for drawing glass cylinders from a bath of molten glass, means for drawing a glass cylinder having a passage restricted with reference to the diameter of the cylinder, said passage setting up communication between the outside atmosphere and the space within the cylinder, and a jet for directing fluid under pressure into and through said passage which is open to the atmosphere whereby to supply fluid under pressure within the drawn cylinder.

13. In apparatus for drawing glass cylinders from a bath of molten glass, a bait for drawing the cylinder having a passage setting up communication between the interior space of the hollow cylinder and the outside atmosphere, said bait having a continuous ledge adapted to support a hollow glass novel non-adherent thereto, and a jet for directing fluid under pressure into and through said passage, said jet being of such size relative to said passage and so disposed relative thereto as to allow for the escape of the fluid from within the hollow drawn cylinder to the free atmosphere.

14. In apparatus for drawing glass cylinders from a bath of motlen glass, a bait for drawing the cylinder having a bottom opening and an interior surface to support a glass novel non-adherent thereto at the point of contact to the bait, said bait having a passage restricted with reference to the diameter of the cylinder and setting up communication between the outside atmosphere and the space within the cylinder, and a jet for directing fluid under pressure through said restricted passage which is in communication with the atmosphere to supply fluid under pressure within the drawn cylinder.

15. In the art of drawing glass cylinders from a bath of molten glass, the method of supplying air within the drawn cylinder, which consists in forcing a jet or stream of air under pressure into and through a venting passage, extending from the interior of the drawn cylinder to the free atmosphere, of less cross-sectional area than that of the cylinder being drawn but larger in cross-sectional area than the jet or stream of air under pressure.

16. In the art of manufacturing hollow glass articles from molten glass, the method of blowing the hollow articles by injecting a stream of air under pressure through a passage restricted as compared to the diameter of the hollow article, and allowing the excess of air in the hollow article to escape to the free atmosphere through said restricted passage.

17. In apparatus for drawing glass cylinders from a bath of molten glass, a bait having a bottom opening and a substantially continuous interior ledge surrounding said opening to receive and support a novel non-adherent thereto, said apparatus having a passage leading to the cylinder being drawn, which is of smaller cross sectional area than the bait, said passage also setting up communication between the free atmosphere and space within the cylinder being drawn by said bait, and means for directing a jet of air under pressure through said passage into the cylinder being drawn.

18. The process of drawing glass cylinders from a bath of molten glass, which consists in forming a hollow glass novel from the glass of the bath, supporting the novel non-adherent upon a suitable bait, raising the bait and novel to draw a hollow cylinder from the bath and directing a jet of air through a passage open to the atmosphere and leading to the hollow cylinder, said passage being restricted relative to the area of the novel and hollow cylinder being formed, whereby the air within the hollow cylinder is utilized for expanding and maintaining the expanded shape of the hollow cylinder during the drawing thereof.

In testimony whereof I hereby affix my signature.

ARTHUR E. SPINASSE.